United States Patent [19]

Iida

[11] 4,408,301
[45] Oct. 4, 1983

[54] PICTURE INFORMATION FILING SYSTEM

[75] Inventor: Kazuhiko Iida, Yokohama, Japan

[73] Assignee: Tokyo Shibaura Denki Kabushiki Kaisha, Japan

[21] Appl. No.: 203,573

[22] Filed: Nov. 5, 1980

[30] Foreign Application Priority Data

Nov. 6, 1979 [JP] Japan .................................. 54-143714
Nov. 6, 1979 [JP] Japan .................................. 54-143715
Nov. 6, 1979 [JP] Japan .................................. 54-143717

[51] Int. Cl.³ .............................................. G06F 3/14
[52] U.S. Cl. .................................... 364/900; 364/200; 340/724
[58] Field of Search ... 364/200 MS File, 900 MS File; 340/723, 724

[56] References Cited

U.S. PATENT DOCUMENTS 3,976,982  8/1976  Eiselen ................................ 364/900
4,069,511  1/1978  Lelke .................................. 364/200
4,125,873  11/1978 Chesarek ............................ 364/900

Primary Examiner—Gareth D. Shaw
Assistant Examiner—Terence T. Flyntz
Attorney, Agent, or Firm—Cushman, Darby & Cushman

[57] ABSTRACT

A first location and a last location of the required part of a first piece of picture information displayed at a display part are specified by cursors. Cleared data is transferred to a picture element memory where said picture information is stored for removing unnecessary picture information. The extracted necessary picture information is recorded in a magnetic tape device. Only the necessary part of a second piece of picture information is extracted in a similar manner and is recorded in the magnetic tape device. A logic sum of a title input from the keyboard and said first piece of picture information is obtained for each scanning line to provide a first synthesized picture. A logic sum of the first synthesized picture and said second piece of picture information is obtained for each line to provide a second synthesized picture.

3 Claims, 13 Drawing Figures

FIG. 10
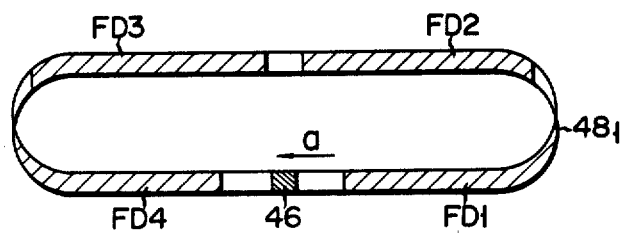
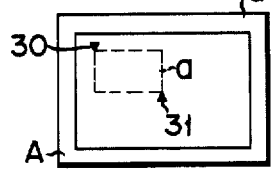
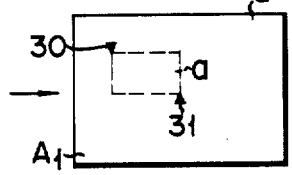
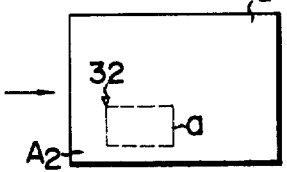
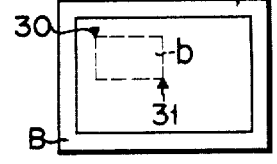
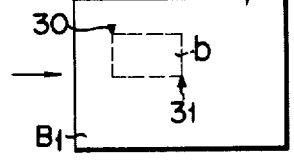

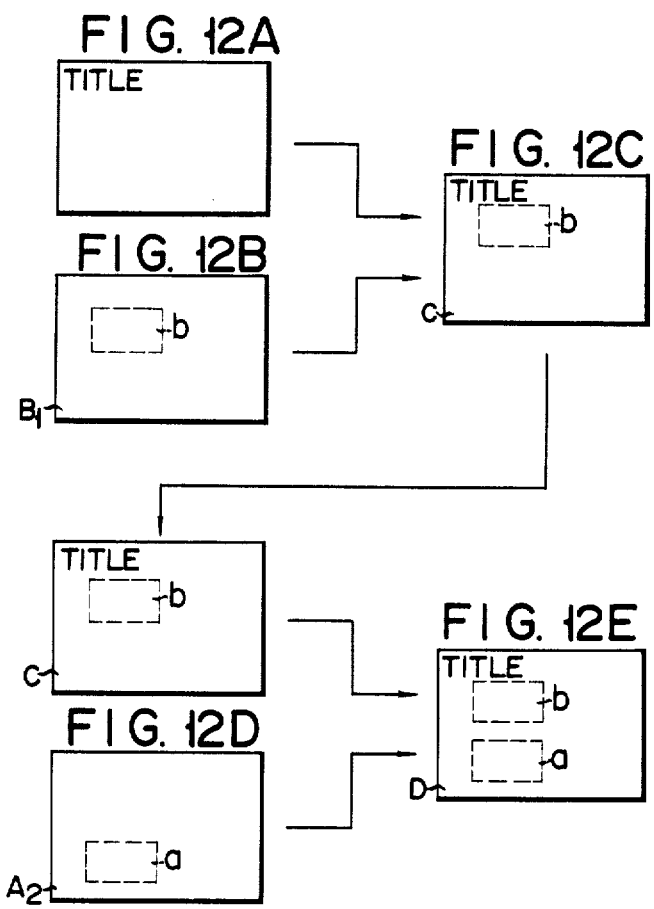

PICTURE INFORMATION FILING SYSTEM

BACKGROUND OF THE INVENTION

The present invention relates to a picture information filing system which has functions of indexing and soft copying of picture information and so on and which is capable of compiling operations such as extraction, insertion and deletion.

A picture information filing system has been recently developed which photoelectrically converts picture information such as various types of documents by two-dimensional scanning, stores the photoelectrically converted picture information in a picture information memory of large capacity, and records or displays the stored picture information as a two-dimensional visible picture by indexing, compiling or reproducing as needed.

The following two methods are feasible for preparing one manuscript incorporating a predetermined part a of an original A and a predetermined part b of an original B. The first method utilizes a xeroxing machine. Xeroxed copies A1 and B1 of the originals A and B are prepared using the xeroxing machine. The required part a of the xeroxed copy A1 and the required part b of the xeroxed copy B1 are cut away and adhered to a blank paper sheet. Another xeroxed copy of this blank paper sheet with the parts a and b is prepared to provide the desired manuscript. The second method utilizes a word processor when the originals A and B involve only characters. The originals A and B are stored in a floppy disk as a file A and a file B. The predetermined part a of the file A and the predetermined part b of the file B are read into a random access memory inside the word processor. A new file is prepared by compiling these parts. The new file is printed out with a printer or the like to provide a manuscript incorporating the required parts of the two different originals A and B.

However, with the first method, the originals must be xeroxed and the required parts must be cut so that unnecessary parts or trash increases. Furthermore, these xeroxing and cutting operations are cumbersome to the operator. The second method, on the other hand, has been limited to compiling operations of originals which contain only characters, and compiling operations including complex patterns have been impossible with this method.

An optical character reader is disclosed as a prior art technique in the Japanese patent publication No. 49-45176. According to this system, a character is divided into a plurality of sections and the information of respective sections is stored in a plurality of memory banks, thereby significantly shortening the memory access time for pattern preprocessing or pattern recognition, and thus improving the processing speed of the pattern recognition type processor.

Japanese Laid-open Patent Application No. 49-36242 discloses a picture information indexing system in which stationary picture information is projected on a screen by an indexing device incorporating an optical recording member, and variable information outputted to an electronic display device from an electronic computer is superposed on the image on the screen using a projecting optical system.

SUMMARY OF THE INVENTION

It is the primary object of the present invention to provide a picture information filing system which is capable of compiling operations such as synthesis of picture information with ease and without requiring cutting or adhering.

To the above and other ends, the present invention provides a picture information filing system having a picture element memory for storing picture information in units of picture element information, and a picture information display device for displaying the contents of said picture element memory comprising:
 means for inputting said picture information;
 means for reading out picture information stored in said picture element memory; and
 means for selectively synthesizing two kinds of picture information pieces obtained with said inputting means and said reading means.

BRIEF DESCRIPTION OF THE DRAWINGS

Other objects and features of the present invention will be apparent from the following description taken in connection with the accompanying drawings in which:

FIG. 10 is a view illustrating the recording format of the index information recording track for one excursion of the magnetic tape;

FIGS. 11A through 11F are views illustrating display of picture information at the picture information display device;

FIGS. 12A through 12E are views illustrating the conditions of picture information in the picture element memory shown in the embodiment of FIG. 2.

DETAILED DESCRIPTION OF THE PREFERRED EMBODIMENT

Figure 1:
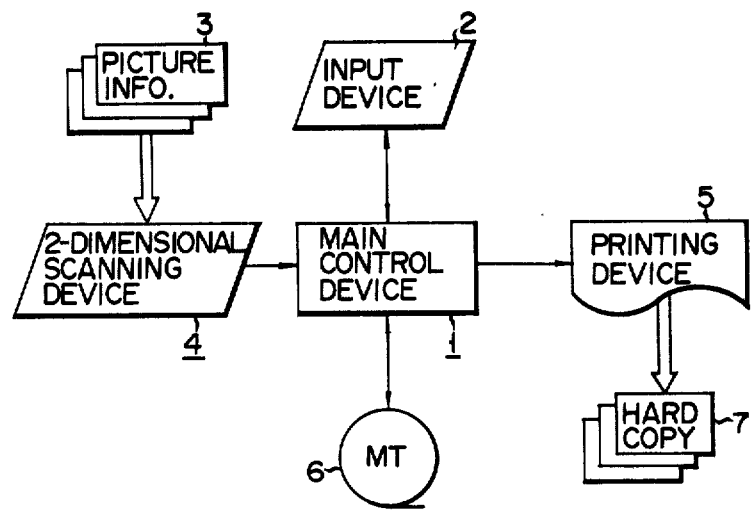
FIG. 1 is a block diagram illustrating the schematic construction of a picture information filing system to which the present invention is applied.

FIG. 1 is a block diagram showing the schematic construction of a picture information file system, to which the invention is applied.

A main control unit 1 effects compiling operations such as recording, reproduction, addition, insertion and deletion of picture information and index information which may be provided as input information from an input device 2 having a display function such as a keyboard display. Picture information 3 of a document or the like is photoelectrically converted through two-dimensional optical scanning in a two-dimensional scanning device 4, and the resultant picture information (video signal) is supplied through the main control device 1 to a printing device 5 or a magnetic tape device 6. The printing device 5 receives the picture information from the two-dimensional scanning device 4 or reproduced picture information from the magnetic tape device 6 and produces therefrom two-dimensional visible images as hard copies 7.

Figure 2:
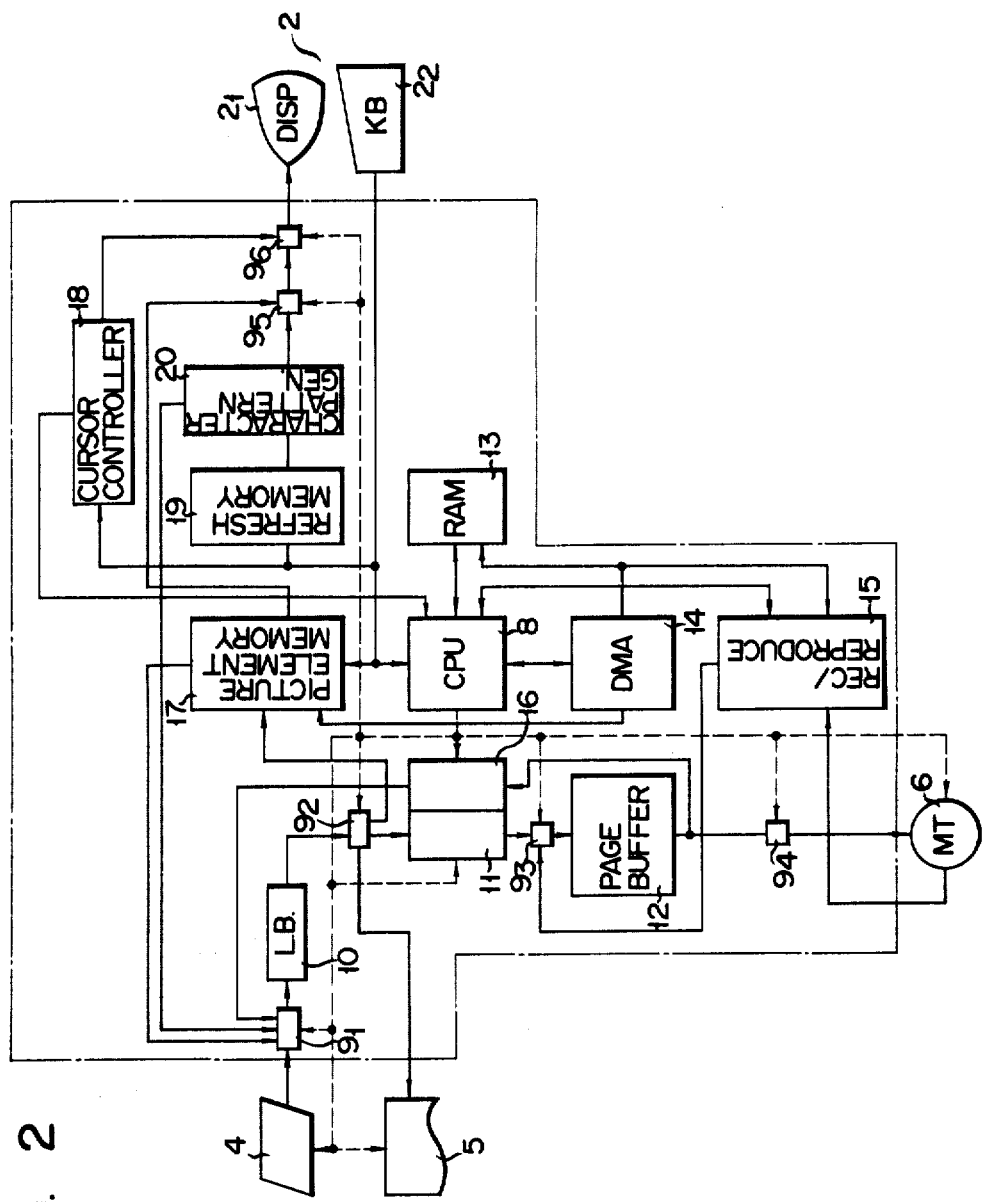
FIG. 2 is a block diagram showing the picture information filing system of FIG. 1 in detail.

FIG. 2 shows a block diagram showing the main control device shown in FIG. 1 in detail. In the Figure, solid lines indicate the flow of data, and dashed lines indicate the flow control signal.

Referring to the Figure, the two-dimensional scanning device 4 is connected through a first selector $9_1$ to a line buffer 10. In the two-dimensional scanning device 4, the picture information 3 of a document or the like set there is photoelectrically converted through two-dimensional scanning with a laser beam. The line buffer 10 memorizes the photoelectrically converted picture information for each scanning line. It is connected through a second selector $9_2$ to a signal compressing circuit 11. The compressing circuit 11 is provided for compressing the input picture information. If picture information of a unit quantity (i.e., for one page) is to be directly memorized, a memory of a very large capacity is required. However, the picture information often contains very much redundancy, so that it is compressed (i.e., its redundancy is reduced) for memorizing it. Hereinafter, in this embodiment, "compressing" is referred to as "reducing the redundancy of the picture information". As the method of compression, band width compression, for instance through the well-known modified Hoffman conversion, is made. The modified Hoffman conversion is a technique used for data compression and adopted as standard technique in the facsimile field by the CCITT (International Telegraph and Telephone Consultation Committee). It is a one-dimensional run-length coding technique (using a one-dimensional run-length coding system), in which the longest run-length or one line is constituted by 1,728 bits (corresponding to the short side of the A-4 size). Particular codes are provided for bit numbers of white run-lengths (overall length of continuous white bits) and also for those of black run-lengths (overall length of continuous black bits). For example, a code "10011" corresponds to a white run-length of "8" (i.e., eight continuous white bits), and a code "0011" is provided for a black run-length of "5" (i.e., five continuous black run-lengths). As the document is scanned by the scanner, white and black data are alternately obtained as a natural result, and the bit numbers of these data are counted for coding the data according to the counted bit numbers. The modified Hoffman conversion permits data compression of the document information to about one-eighth in average. The compressed line information is supplied through a third selector $9_3$ to a page buffer 12. The page buffer 12 successively memorizes picture information as unit information, i.e., for one page. It is connected through a fourth selector $9_4$ to the magnetic tape device 6, so that its picture information output is recorded therein for each unit.

The recording of data in the tape device 6 and reading of data therefrom are effected by a record/reproduce circuit 15. To the record/reproduce circuit 15 is also connected a direct memory access (DMA) 14, which has a function of reading out data of the magnetic tape device 6 and transferring the read-out data directly to a random access memory (RAM) 13 without agency of a central processing unit (CPU) 8. A picture element memory 17 stores the picture information from the two-dimensional scanning device and the picture information from the direct memory access 14. This memory 17 functions as a display buffer for a display part $2_1$ and has a memory capacity corresponding to the display capacity of the display part $2_1$. A refresh memory 19 stores the characters keyed in from a keyboard $2_2$ of the input device 2. The character code information is outputted from the refresh memory 19 to a character pattern generator 20. The character pattern generator 20 supplies to the first selector $9_1$ the character pattern information corresponding to the input character code information. A cursor control circuit 18 controls the cursor display of the display part $2_1$ according to a command from the central processing unit 8 to be described later. The central processing unit 8 supplies a control signal to the two-dimensional scanning device 4, the printing device 5, first through sixth selectors $9_1$ through $9_6$, the signal compressing circuit 11, a signal elongation circuit 16, the magnetic tape device 6, and the record/reproduce circuit 15. The central processing unit 8 is also connected for exchange of data to the direct memory access 14, the random access memory 13, the picture element memory 17, the refresh memory 19, and the cursor control circuit 18.

Figure 3:
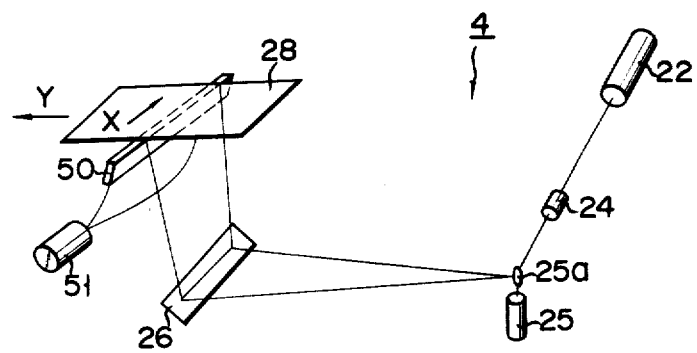
FIG. 3 is a schematic drawing of the two-dimensional scanning device shown in FIG. 2.

FIG. 3 shows the detailed construction of the two-dimensional scanning device 4. In the Figure, the two-dimensional scanning device 4 includes a laser oscillation tube 22, an optical system 24 having various lenses for focusing the incident laser beam and an optical scanning 25 disposed in the light path of the laser beam issuing from the laser oscillation tube 22. The optical system 24 is constructed with a group of focusing lenses for focusing the incident laser beam on the surface of original 28.

The optical scanner 25 is constructed as a galvanomirror system having a movable mirror 25a, which is adapted to reflect the incident laser beam in such a manner as to convert the incident laser beam into a linear scanning beam. A rocking mirror 26 rotatable about a horizontal axis is provided on the forward side of the two-dimensional scanning device 4. It extends horizontally and has a rectangular shape. The original 28 is disposed about the rocking mirror 26. The linear scanner laser beam from the optical scanner 25 is incident on and reflected by the rocking mirror 26. The reflected laser beam scans the surface of the original 28 when the rocking mirror 26 is in its position directed obliquely upwards, (i.e., a reading position). Since the original 28 is horizontally disposed, it is movable in a direction of making rightward angles with respect to a direction normal to the rocking mirror 26 (for instance in a Y-direction if the direction normal to the rocking mirror 26 is an X-direction). An optical fiber means 50 is disposed beneath the original 28 and receives light reflected therefrom. A photoelectric converter 51, to which the optical fiber means 50 is connected, converts light received by the optical fiber means 50 into an electric signal according to the intensity of the received light. Each optical fiber means 50 may be constructed with a number of optical fibers arranged in a row extending in the longitudinal direction (i.e., X-direction) of the original 28, with the individual optical fibers in contact with the surface of the original 28 and the other end optically shielded and coupled to the photoelectric converter 51. The photo-electric converter 51 may be constructed with a photo-multiplier or a photo-diode.

Figure 4:
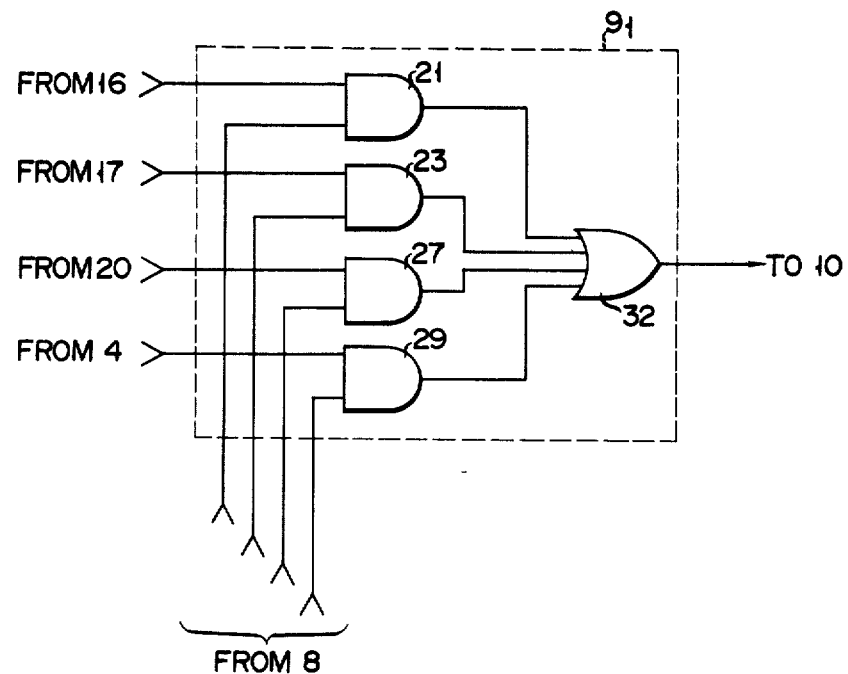
FIG. 4 is a circuit diagram of a selector circuit of the embodiment shown in FIG. 2.

FIG. 4 is a schematic circuit diagram of the first selector circuit $9_1$ of the embodiment shown in FIG. 2. AND gates 21, 23, 27 and 29 obtain logic products of the control information from the CPU 8 with the picture information from the signal elongation circuit 16, the picture element memory 17, the character pattern generator 20, and the two-dimentional scanning device 4. The outputs of these gates 21, 23, 27 and 29 are supplied to an OR gate 32 to obtain a logic sum of the picture information. The logic sum output is supplied to the line buffer 10.

Figure 5:
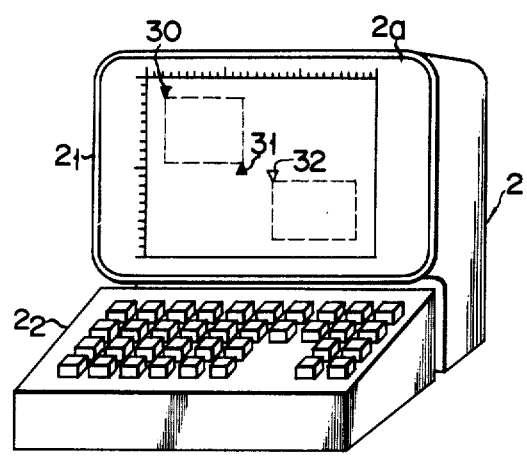
FIG. 5 is a perspective view schematically illustrating the input device.

FIG. 5 shows the input device 2 of the embodiment shown in FIG. 2. The input device 2 comprises a picture information display part $2_1$ and a keyboard $2_2$. The picture information display part $2_1$ can display picture information as a graphic display as well as characters or the like and is of dot construction of, for example, $2,000 \times 3,000$ bits. On a screen $2a$ of the picture information display part $2_1$ are displayed the picture information, cursors 30 and 31 for commanding the compiling area, and a displacing cursor 32 for commanding the displacing position of the compiling area. The keyboard $2_2$ is used to input a storing command for storing the picture information, and an index code representing the name of the picture information to be stored; to input an indexing command and an index code of the required picture information for indexing and obtaining the reproduction output of the recorded and stored picture information; and to input a corresponding compiling command, i.e., an extraction command, and insertion command, a deletion command or the like for compiling. The signal from the keyboard $2_2$ is supplied to the main control device 1 (FIG. 1). In response to the output signal of the keyboard $2_2$, the main control device 1 (FIG. 1) performs the compiling operations such as recording, reproduction, addition, insertion, deletion and so on of picture information and index information.

Figure 6:
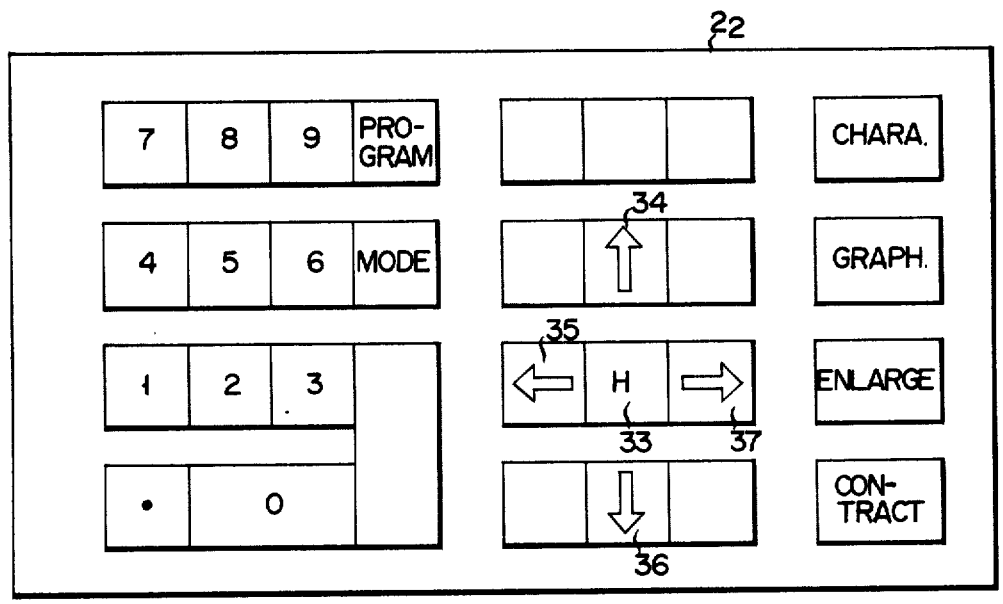
FIG. 6 is a view illustrating the arrangment of the keyboard on the input device shown in FIG. 5.

FIG. 6 shows part of the keyboard $2_2$ of the input device 2 shown in FIG. 5. The cursor positions as shown in FIG. 5 are attained by cursor control keys 33, 34, 35, 36 and 37. When the home position key 33 is depressed, the cursor is displayed at the home position (upper left corner) of the screen. The cursor control key 37 is depressed to shift the cursor one dot to the right. The cursor control key 35 is depressed to shift the cursor one dot to the left. The cursor control key 34 is depressed to shift the cursor two dots upward. The cursor control key 36 is depressed to shift the cursor two dots downward. The cursor is displayed as continuously displaced while any of these coursor control keys is being depressed. Although the cursor is shifted by one dot transversely and by two dots vertically upon depressing the corresponding cursor control key, the construction may be freely changed by a control program (contained in the CPU 8) for supplying a cursor control signal to the cursor controller 18 for shifting the cursor by a desired number of dots.

Figure 7:
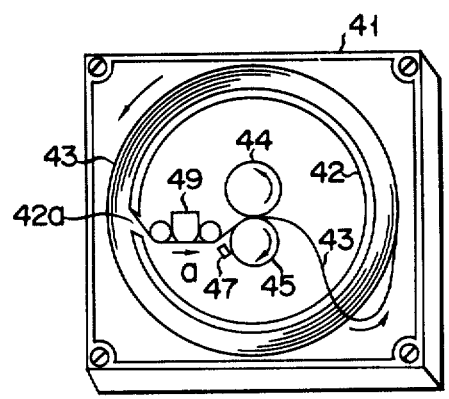
FIG. 7 is a schematic view illustrating the construction of the cassette tape and a tape feed mechanism of the magnetic tape device of the embodiment of FIG. 2.
Figure 8:
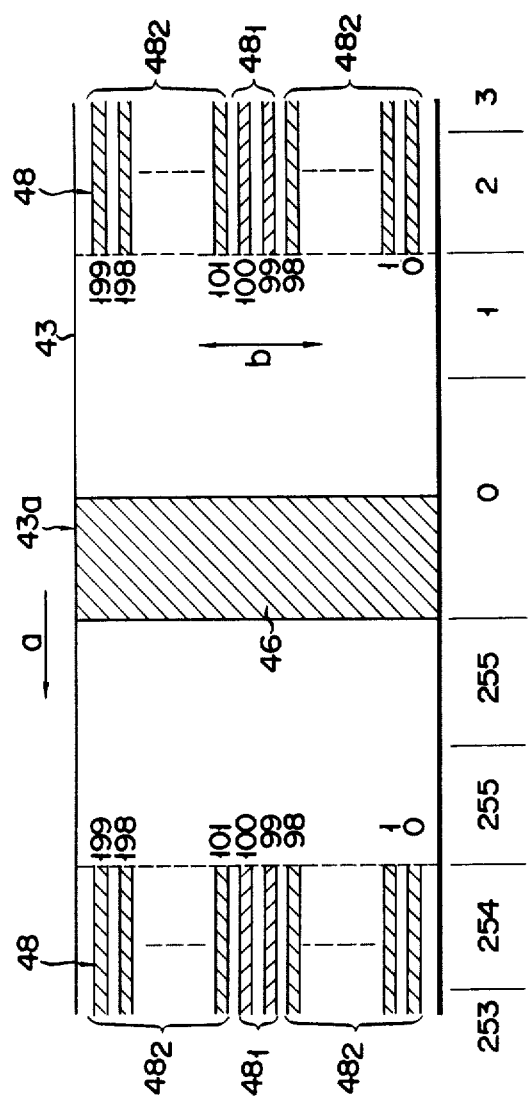
FIG. 8 is a format view illustrating the tracks and blocks of a magnetic tape.

FIG. 7 schematically shows a cassette tape and a tape feed mechanism section of the magnetic tape device 6. Within a case 41 a stationary reel 42 is provided, and an endless magnetic tape 43, for instance having a width of ½ inch (about 12.7 mm) and a length of about 36 m, is wound on the reel 42. When the cassette tape of this construction is loaded, a portion of the tape 42 constituting the innermost turn thereof wound on the reel 42 is pulled out through a window $42a$ formed in the reel 42 and fed out by a capstan 44 and a pinch roller 45 at a high speed (about 5 m/sec.) in the direction of arrow a in the Figure to be re-wound as the outermost turn of the tape 43. The tape 43 is thus caused to complete one excursion in about 7.2 seconds. One excursion of the tape 43 is confirmed when a tape mark 46 such as a silver foil applied to the seam of the endless tape 43, as shown in FIG. 5, is optically detected by a mark detector 47. The output signal of the detector 47 is also used as a reference for detecting blocks in the tape 43 (to be described hereinafter). As shown in FIG. 8, on the tape 43 two hundred parallel recording tracks 48 are set to extent in the running direction a of the tape (with a track width of about $40\mu$ and an intertrack pitch of about $52\mu$). The recording tracks 48 are given respective track numbers "0", "1", ..., "199" from the lowermost track in the Figure. Of these tracks, practically central two (with track numbers "99" and "100", the track "99" being a spare track) are index recording tracks $48_1$ for recording index information for corresponding unit picture information (the index information consisting of index code and recording address, which consists of track number and block number), while the other one hundred and ninety-eight tracks (with track numbers "0" through "98" and "101" through "199") are picture information recording tracks $48_2$ for recording picture information. Each of the recording tracks 48 is divided into two hundred and fifty-six blocks, which are given successive block numbers "0", "1", ..., "255" with the tape mark 46 as reference. The recording of information on or reproduction thereof from the magnetic tape 43 is made by selecting a given recording track 48 with reciprocal movement of a recording/reproducing head 49 (a two-gap magnetic head having an erasing function) provided in the neighborhood of the capstan 44, the movement being caused by a head access mechanism (not shown) in directions b perpendicular to the running direction a.

Figure 9:
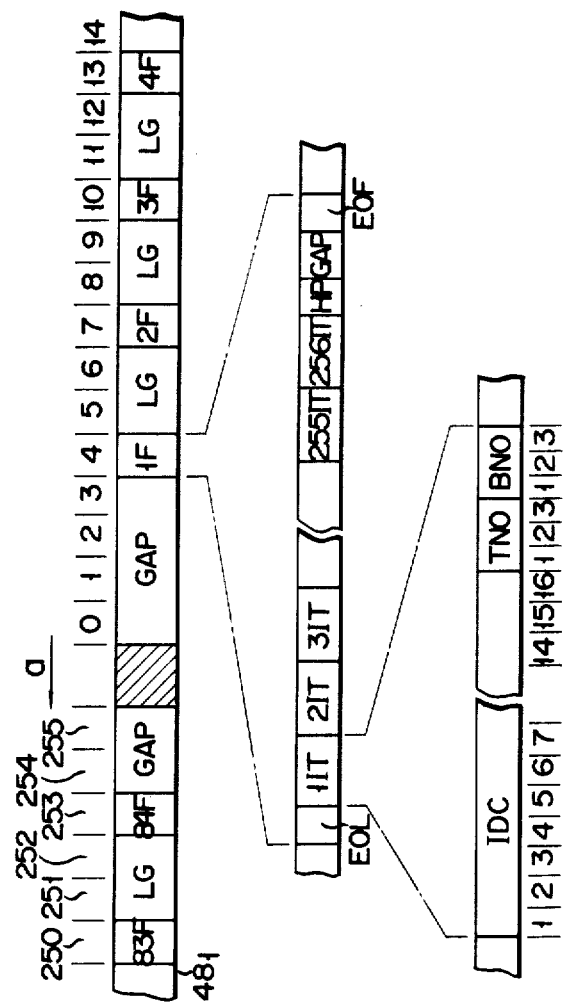
FIG. 9 is a format view illustrating the recording format of index information recording track in detail.

FIG. 9 shows the recording format of the index recording track $48_1$. Here, of two hundred and fifty-six blocks, every but two blocks from the fourth block, i.e., the 4-th, 7-th, 10-th, 13-th and so forth block, are used for recording the index information. These blocks are respectively called 1-st frame (1F), 2-nd frame (2F), 3-rd frame (3F), 4-th frame (4F) and so forth. The two blocks between adjacent frames constitute an ineffective information area (LG) for searching for index information to be described hereinafter. While in the instant embodiment the ineffective information areas are mere gaps where nothing is recorded, it is possible to record dummy information in these areas. Each of the frames consists of a frame start code (EOL), 1-st to 256-th items (IT), a horizontal parity check code (HP), a recording gap (GAP) and a frame end code (EOF). Each of the items consists of an Arabic figure symbol constituted by sixteen figures at the most, a track number (TNO) of the track in which the picture information having that index code name is recorded, and a block number (BNO) of the first one of the blocks in which that picture information is recorded. In this embodiment, two hundred and fifty-six items of index information are recorded as a unit index information group in one frame. The Arabic figure symbol in the index code consists of seven unit codes and a vertical parity check code, and the track number and block number individually consist of the seven unit codes of figures and a vertical parity check code of one bit. In the index information recording track $48_1$, index information of entirely the same content is recorded several times for the purposes of reducing the period for searching for index information and also eliminating adverse effects of drop-out and so forth. For example, the same index information is recorded for every twenty-one frames, that is, four times with one excursion of the tape 43, as shown in FIG. 10. In this case, the same index information is recorded in regions FD1 to FD4, with the region FD1 beginning with the 1-st frame, the region FD2 with the 22-nd frame, the region FD3 with 43-rd frame and the region FD4 with the 64-th frame. The regions FD1 through FD4 are individually called file information groups, which consists of all the index information for the picture information capable of being recorded on one tape 43.

The storage and indexing of picture information will now be described in detail referring to FIGS. 1 and 2. The storage of picture information will first be described. When a storage command and an index code of at most 16 digits representing the name of the picture information to be stored is input from the keyboard $2_2$, the CPU 8 receives this and operates the two-dimensional scanning device 4 and the magnetic tape device 6. The two-dimensional scanning device 4 scans the set picture information 3 such as documents in a two-dimensional manner with a laser beam for photoelectric conversion. The photoelectrically converted picture information is stored in the line buffer 10 through the selector $9_1$ in single scanning lines. The line information stored in the line buffer 10 is supplied to the signal compressing circuit 11 through the selector $9_2$ for band-width compression by MH (modified Hoffman) conversion. The compressed line information is supplied to the page buffer 12 through the selector $9_3$ and is sequentially stored. When the picture information corresponding to one unit is stored in the page buffer 12, the CPU 8 displaces the head 49 to a picture information recording track $48_2$ for recording the new piece of picture information, supplies the picture information inside the page buffer 12 in single scanning lines to the magnetic tape device 6 through the selector $9_4$, that is, to the head 49 so that the above-mentioned new piece of picture information is recorded in a designated block, that is, in the block two blocks after the last previously recorded block. It is possible to specify, in the following manner, in which block of the information recording track the new piece of information is to be recorded. Immediately after the tape 43 of the magnetic tape device 6 starts travelling, the index information recording track $48_1$ is reproduced with the head 49. The track number (TNO) and the block number (BNO) in the last item (IT) are detected and stored in the indexing memory RAM 13. In this last item, a particular special code (not employing alphanumeric symbols) is recorded at the start of the recording index information, that is, the index code (IDC) which is added to the last index information recorded in the index information recording track $48_1$.

The indexing and reproduction output of picture information which is recorded and stored in the manner mentioned above will be described. When an index code of the picture information which is required and an indexing command are input from the keyboard $2_2$, the CPU 8 advances or rewinds the tape 43 and locates the head 49 at the index recording track $48_1$ to start reproduction of the track $48_1$. When the third block (block number "3") of the tape 43 is assumed to be passing the head 49, the CPU 8 supplies a transfer command for one frame to the DMA 14. Thus, the DMA 14 supplies a reproduction command to the record/reproduce circuit 15, and the DMA 14 receives the reproducing signal from the head 49. Thereafter, when the record/reproduce circuit 15 detects the frame start code (EOL), the DMA 14 temporarily stops the CPU 8 and the record/reproduce circuit 15 directly stores the received signal, that is, the index information group of the first frame in the specified area of the RAM 13. When the record/reproduce circuit 15 detects a frame end code (EOF), the DMA 14 stops operating. Then the CPU 8 sequentially indexes, from the first item, the index code which is the same as that of the required picture information from the index information group of the first frame transferred to the RAM 13 by comparison with the input index code. It is assumed that the index code which is the same as the required index code (input index code) has been found. Then, the CPU 8 reads out the track number (TNO) and the block number (BNO) following this index code (IDC) from the index information group and stores it in the specified area of the RAM 13 again. The CPU 8 displaces the head 49 to the information recording track $48_2$ corresponding to the stored track number and begins reproduction of this track. Since the block counter is operating, when the counted contents correspond to the stored block number, the CPU 8 stores the reproducing signal from that point, that is, the picture information, in the page buffer 12 through the record/reproduce circuit 15 and the selector $9_3$. When the reproduced picture information corresponding to one unit is stored in the page buffer 12, the CPU 8 supplies the picture information (compressed information) in single scanning lines to the signal elongating circuit 16 for elongating the band by MH reverse conversion and for returning the picture information to its original state. The CPU 8 sequentially supplies it to the line buffer 10 through the selector $9_1$. The line information supplied to the line buffer 10 is sequentially supplied as series information signals to the recording device 5 through the selector $9_2$ in synchronism with the recording timing of the recording device 5. The recording device 5 thereby outputs the reproduced picture information as a hard copy 7.

Soft copying of the picture information thus recorded and stored will be described. When a soft copy command and an index code of the required picture information are input from the keyboard $2_2$, the CPU 8 advances or rewinds the tape 43 and positions the head 49 at the index recording track $48_1$ for beginning reproduction of the track $48_1$. The operation is the same as in the case of the indexing of picture information. When the same index code as the required index code is found, the CPU 8 reads out the track number (TNO) and the block number (BNO) following this index code (IDC) from the index information group in the RAM 13 for storing them in the specified area of the RAM 13 again. The CPU 8 displaces the head 49 to the information recording track $48_2$ corresponding to the recorded track number to start reproduction of the track. Since the block counter is in operation, when the counted contents correspond to the stored block number, the CPU 8 starts storing the reproducing signal, that is, the picture information, in the page buffer 12 through the record/reproduce circuit 15 and the selector $9_3$. When the reproduced picture information corresponding to one unit is stored in the page buffer 12, and CPU 8 supplies the picture information (compressed information) to the signal elongation circuit 16 in single scanning lines, which are elongated by MH reverse conversion to be returned to the original picture information which is sequentially supplied to the line buffer 10 through the selector $9_1$. The line information supplied to the line buffer 10 is sequentially supplied to the picture element memory 17 through the selector $9_2$. This picture element memory 17 stores the supplied picture information corresponding to one paper sheet as picture element information. The output of the picture element memory 17 is supplied to the picture information display part $2_1$ which displays the picture information as a soft copy.

The compiling operations of the picture information recorded in the magnetic tape device 6 with the device having the above-mentioned functions will be described. By soft copying of the picture information as described above, the picture information A as shown in FIG. 11A is displayed at the picture information display part $2_1$. When the positions of the cursors 30 and 31 specifying the compiling area are input from the keyboard $2_2$, this data is stored in the cursor controller 18. The output of the cursor controller 18 is supplied to the picture information display part $2_1$ through the selector $9_6$. When an extraction command of the compiling area is input from the keyboard, the CPU 8 supplies to the DMA 14 an address of the picture element memory 17 corresponding to the extraction command and the compiling area a according to the contents of the cursor controller 18. Then, the DMA 14 clears all picture information other than the picture element memory 17. This is accomplished by transferring at high speed the zero data corresponding to one line of the stored data in the RAM 13 to the picture element memory 17. As a result, the picture information A1 of the address corresponding to the compiling area a alone is left in the picture element memory 17, and this information is supplied to the picture information display part $2_1$ through the selectors $9_5$ and $9_6$. Thus, the extracted compiling area a is displayed as shown in FIG. 11B. When the position of the displacing cursor 32 for specifying the displacement of the compiling area a is input from the keyboard $2_2$, the data is stored in the cursor controller 18. The output of the cursor controller 18 is supplied to the picture information display part $2_1$ through the selector $9_6$ and is displayed there. When a displacement command of the compiling area a is input from the keyboard 2, the CPU 8, according to the contents of the cursor controller 18, supplies the address of the picture element memory 17 corresponding to the displacement command and the displacement position to the DMA 14. The DMA 14 transfers the picture information at the addresses corresponding to the compiling area a of the picture element memory 17 to the addresses corresponding to the displaced position, respectively. When this transfer is completed, the picture information A2 with displaced compiling area a is stored in the picture element memory 17 and the compiling area a displaced to the position corresponding to the position of the displacement cursor 32 is displayed at the picture information display part $2_1$ as shown in FIG. 11C. When a storing command of the picture information A2 is input from the keyboard $2_2$, the contents of the picture element memory 17 are supplied to the magnetic tape device 6 through the selector $9_1$, $9_2$, $9_3$ and $9_4$, the line buffer 10, the signal compressing circuit 11 and the page buffer 12 and is written in the auxiliary track (track No. 100) of the magnetic tape device 6. Simultaneously, the index code corresponding to the picture information A2 is also written.

The picture information B as shown in FIG. 11D is displayed at the picture information display part $2_1$ by the above-mentioned soft copying function. When the position of the cursor specifying the compiling area b is input from the keyboard $2_2$ and an extraction command of the compiling area b is input, the picture information B1 with the extracted compiling area b is stored in the picture element memory 17 as described above, and the extracted compiling area b, as shown in FIG. 11E, is displayed at the picture information display part $2_1$. When a storing command of the picture information $B_1$ is input from the keyboard $2_2$, the current contents of the picture element memory 17 and the index code are recorded on the auxiliary track of the magnetic tape device 6.

When the title is input from the keyboard $2_2$, its character codes are stored in the refresh memory 19. The output of the refresh memory 19 is supplied to the character pattern generator 20. The character pattern generator 20 decomposes the supplied character codes into character patterns and generates a signal for every row or every column of the character pattern. These signals are supplied to the picture information display part $2_1$ through the selectors $9_5$ and $9_6$, and the title is displayed, as shown in FIG. 11F.

When an insertion command and the index code of the picture information B1 are input from the keyboard $2_2$ under this condition, the picture information B1 corresponding to the index code is as in the case of the indexing read out from the auxiliary track of the magnetic tape device 6 and is supplied to the picture element memory 17. The picture information B1 stored in the picture element memory 17 is supplied to the AND gate 23 of the selector $9_1$ in single lines. Simultaneously, the character pattern for one row or one column of the character codes stored in the refresh memory 19 is supplied from the character pattern generator 20 to the AND gate 27 of the selector $9_1$. The control information is also supplied to the AND gates 23 and 27, and the AND gates 23 and 27 supply their outputs to the OR gate 32. The OR gate 32 outputs a logic sum of the input picture information B1 and the character pattern information (title) to the line buffer 10. This synthesized picture information is supplied to the picture element memory 17 through the selector $9_2$. As a result, the picture information C which is the synthesis of the picture information B1 and the character pattern, as shown in FIG. 12C, is stored in the picture element memory 17.

When an insertion command and an index code of the picture information A2 are input from the keyboard $2_2$, the picture information A2 corresponding to the input index code is read out of the auxiliary track of the magnetic tape device 6 in a similar manner as described above and is supplied to the page buffer 12. The picture information stored in the page buffer 12 is supplied to the AND gate 21 of the selector $9_1$ through the signal elongation circuit 16 in single lines. Simultaneously, the picture information C stored in the picture element memory 17 is also supplied to the AND gate 23 of the selector $9_1$ in single lines. When control signals are supplied to the AND gate 21 and 23 from the CPU 8, the AND gates 21 and 23 supply their output signals to the OR gate 32. The OR gate 32 obtains a logic sum of the picture information A2 and the picture element information C supplied from the picture element memory 17 and supplies it to the picture element memory 17 through the line buffer 10. As a result, the picture information D which is the synthesis of the picture information A2 and the picture information C, as shown in FIG.

12E, is stored in the picture element memory 17. The picture information stored in the picture element memory 17 is hard copied by the recording device 5.

With the picture information filing system of the present invention, since the logic sum of the information from the keyboard and the picture information from the picture element memory 17 or the picture information from the magnetic tape device is obtained, it is possible to add a sentence to the picture information and it is possible to perform compiling operations such as deletion and addition to the specific format with ease.

Figure 13:
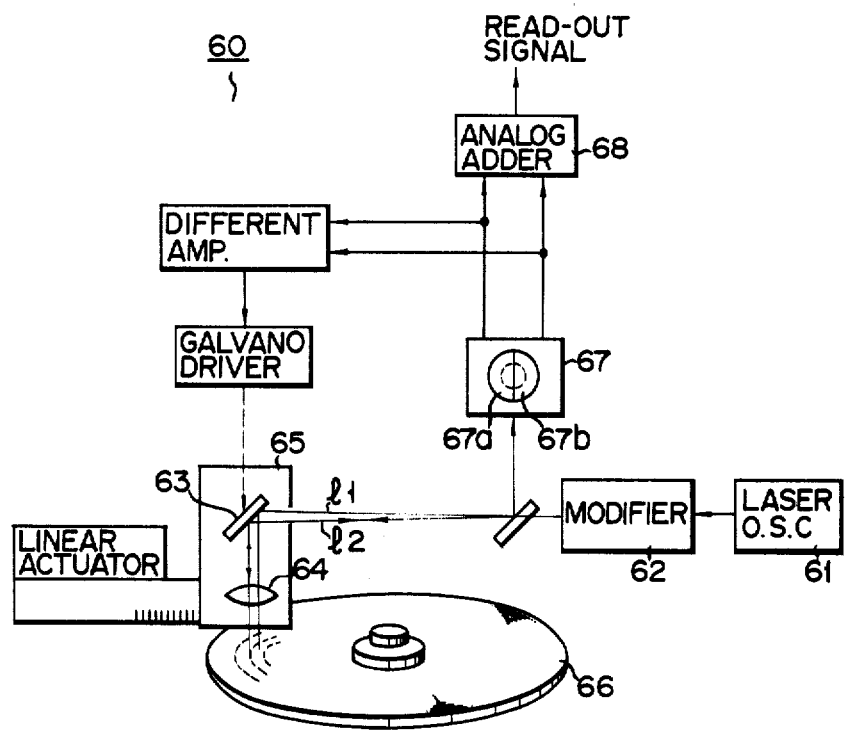
FIG. 13 is a block diagram illustrating the schematic construction of an optical disk memory according to a modified example of the magnetic tape device of the embodiment shown in FIG. 2.

In the above embodiment, the magnetic tape device 6 was used as an external memory device for the picture information. However, an optical disk memory device 60 as shown in FIG. 13 may alternatively be used.

With this device 60, the surface of a document (not shown) to be recorded is read and scanned with a laser beam from a laser beam oscillator 61. By this scanning operation, white and black information or the like of the document is converted into electric signals, i.e., analog signals. Recording signals are prepared by FM modulation of these analog signals. By a modulator 62 driven in response to the recording signals, the laser beam from the laser beam oscillator 61 is on-off modulated. The modulated laser beam $l_1$ is irradiated on an optical disk 66 rotating at a constant speed through an optical head 65 which comprises a galvanometer 63 and a lens system 64. This optical disk 66 is prepared by forming a metal layer on the glass disk, for example, by vacuum evaporation. This metal layer is melted and deformed according to the modulation of the laser beam $l_1$ to form bit rows, thereby recording the information in a spiral track.

For reading out the information thus recorded on the disk 66 in the manner as described above, the disk 66 is rotated at a constant speed. A laser beam $l_2$ generated by the laser beam oscillator 61 is irradiated on the recording track of the rotating disk 66 through the optical head 65. The information is scanned as the disk 66 rotates. The reflected light modulated according to the arrangement of the recorded bits is obtained from the disk 66, and this reflected light is photoelectrically converted by a photoelectric converter 67. The output of the photoelectrical converter 67 is added by an analog adder 68 and is outputted as a read out signal.

What is claimed is:

1. A picture information filing system comprising:
    a two-dimensional scanning device for scanning picture information in a two-dimensional manner and generating electrical signals related thereto;
    a signal compressing circuit for compressing data contained in said electrical signals to form compressed data;
    a page buffer for storing one page of picture information embodied in said compressed data;
    a nonvolatile storage device, responsive to said page buffer, said storage device having a picture information recording area for storing said compressed data, a character code information recording area storing data in the form of alpha-numeric characters and an auxiliary area;
    a record/reproduce circuit for recording/reproducing said information in said storage device;
    a signal elongating circuit for reforming said electrical signals from said compressed data received from said record/reproduce circuit;
    a picture element memory for storing said electrical signals from at least one of said scanning device and said elongating circuit;
    a display device for displaying picture information in response to said electrical signals from said picture element memory, said picture element memory acting as a display buffer for said display device;
    a keyboard device having function keys for specifying areas of picture information displayed on said display device to be extracted and for specifying displacing positions of said extracted areas to obtain picture information, said keyboard device also having character keys for inputting character code information;
    a random access memory for storing blank electric signals for indicating blank areas when applied to said display device;
    a cursor controller, responsive to said keyboard device and connected to said display device for generating signals related to the location of said extracted areas and said displacing positions and for causing cursors to be displayed on said display device related thereto;
    direct memory access means, connected to said random access memory and said picture element memory, for (1) transferring said blank electrical signals to said picture element memory for areas of said picture information outside of said extracted areas and (2) transferring electric signals for said extracted areas from their initial locations in said picture element memory to locations corresponding to said displacing positions to created shifted extracted data, said shifted extracted data being transferred for storage in said nonvolatile storage device auxiliary area through said compressing circuit and said page buffer;
    a refresh memory for temporarily storing said character code information input by said keyboard device;
    a character pattern generator responsive to said refresh memory for outputting to said display device a character pattern corresponding to said character code information;
    logic gate means for selectively synthesizing picture element information from said picture element memory and said nonvolatile storage device, said shifted extracted picture information from said auxiliary area of said nonvolatile storage device and said character pattern information from said character pattern generator; and
    a central processing unit, connected to said display device, said keyboard device, said storage device, said direct memory access means, said random access memory and said logic gate means for (1) controlling the display of said picture information from said picture element memory, (2) controlling said transferring of said blank electrical signals and said transferring of said electric signals, (3) controlling the storage of said shifted extracted data in said nonvolatile storage device and (4) controlling the synthesis by said logic gate means of picture element information from said picture element memory and said nonvolatile storage device, said shifted extracted picture information from said auxiliary area of said nonvolatile storage device and said character pattern information from said character pattern generator.

2. A picture information filing system as claimed in claim 1, wherein said nonvolatile storage device comprises an endless magnetic recording tape.

3. A picture information filing system as claimed in claim 1, wherein said nonvolatile storage device comprises an optical disk.